US009226457B2

(12) United States Patent
Laurence et al.

(10) Patent No.: US 9,226,457 B2
(45) Date of Patent: Jan. 5, 2016

(54) PLANT WALL AND MODULES FOR GROWING PLANTS

(75) Inventors: Mark Laurence, Chichester (GB); Richard Alexander Sabin, Chichester (GB)

(73) Assignee: Biotecture, IP LLC, Chicago, IL (US)

( * ) Notice: Subject to any disclaimer, the term of this patent is extended or adjusted under 35 U.S.C. 154(b) by 436 days.

(21) Appl. No.: 12/872,657

(22) Filed: Aug. 31, 2010

(65) Prior Publication Data
US 2011/0107667 A1    May 12, 2011

(30) Foreign Application Priority Data

Nov. 9, 2009    (GB) .................................... 0919544.7

(51) Int. Cl.
*A01G 25/00*    (2006.01)
*A01G 9/02*    (2006.01)

(52) U.S. Cl.
CPC ...................................... *A01G 9/025* (2013.01)

(58) Field of Classification Search
CPC ........... A01G 31/06; A01G 9/00; A01G 9/02; A01G 9/022; A01G 9/023; A01G 9/024; A01G 9/104; A01G 9/1066; A01G 9/025; A01G 1/00; A01G 1/001; A01G 1/002; A01G 1/005; A01G 1/007; A01G 7/044; E04D 11/00; E04D 11/002
USPC ............ 47/83, 86, 67, 82, 47, 39, 65.8, 66.1, 47/66.5, 79, 80, 81, 62 C, 64; 211/88.03
See application file for complete search history.

(56) References Cited

U.S. PATENT DOCUMENTS

| 320,362 | A | | 6/1885 | Judd |
| 1,345,196 | A | | 6/1920 | Kenndedy et al. |
| 2,279,735 | A | | 4/1942 | Gates |
| 2,514,536 | A | * | 7/1950 | Burney ............................ 47/33 |

(Continued)

FOREIGN PATENT DOCUMENTS

| CN | 2916029 Y | 6/2007 |
| CN | 201087519 Y | 7/2008 |

(Continued)

OTHER PUBLICATIONS

International Search Report and Written Opinion of the International Search Authority Dated: Oct. 5, 2010.

(Continued)

*Primary Examiner* — Joshua Huson
(74) *Attorney, Agent, or Firm* — James P. Hanrath (57) ABSTRACT

A plant wall and module for growing plants is disclosed in which the plant wall and module provide for the controlled delivery of water and nutrients to plants located on the plant wall and module. The plant wall may include a matrix of modules, each module filled with an inert growing medium. The inert growing medium preferably includes openings in which plants are secured and from which plants can grow from the growing medium. An irrigation system delivers water and nutrients to each module and may be removed and replaced from the plant wall without removal of the irrigation system. In addition, a drainage channel, such as a rear drainage channel, is formed so that excess water may exit from the modules. Capillary breaks may also be provided within the growing medium of each module to aid in the distribution of water and nutrients throughout the growing medium.

15 Claims, 9 Drawing Sheets

(56) References Cited

U.S. PATENT DOCUMENTS

| | | | |
|---|---|---|---|
| 3,015,024 A | 12/1961 | Charchan et al. | |
| 4,001,959 A | 1/1977 | Grendahl | |
| 4,062,145 A * | 12/1977 | Gidge | 47/9 |
| 4,295,296 A | 10/1981 | Kinghorn | |
| 4,499,688 A | 2/1985 | Droll | |
| 4,899,487 A * | 2/1990 | Brownlee | 47/41.01 |
| 5,373,662 A | 12/1994 | Wickstrom | |
| 5,598,662 A | 2/1997 | Droste | |
| 5,617,673 A | 4/1997 | Takashima | |
| 5,675,931 A | 10/1997 | Wasserman | |
| 6,296,180 B1 | 10/2001 | Blizzard | |
| 6,470,625 B1 | 10/2002 | Byun | |
| 6,513,284 B1 | 2/2003 | Sandlin | |
| 6,557,806 B2 | 5/2003 | Davies | |
| 6,840,008 B1 | 1/2005 | Bullock et al. | |
| 7,040,053 B1 | 5/2006 | Beesley | |
| 7,243,460 B2 | 7/2007 | Darlington | |
| 7,536,829 B2 | 5/2009 | Genma et al. | |
| 7,596,906 B2 * | 10/2009 | Gold | 47/65.9 |
| 7,722,000 B2 | 5/2010 | Sherburne | |
| 2002/0029517 A1 | 3/2002 | Hutchinson et al. | |
| 2004/0035049 A1 | 2/2004 | McLarty | |
| 2005/0120930 A1 | 6/2005 | Kang | |
| 2006/0156624 A1 | 7/2006 | Roy et al. | |
| 2006/0201061 A1 | 9/2006 | Caron et al. | |
| 2007/0199241 A1 | 8/2007 | Peleszezak | |
| 2008/0000153 A1 | 1/2008 | Sugiyama et al. | |
| 2008/0110086 A1 | 5/2008 | Julia | |
| 2008/0295402 A1 | 12/2008 | Bindschedler et al. | |
| 2008/0302009 A1 | 12/2008 | Frecon et al. | |
| 2009/0007486 A1 | 1/2009 | Corradi | |
| 2009/0223126 A1 | 9/2009 | Garner et al. | |
| 2009/0260282 A1 * | 10/2009 | Hashimoto et al. | 47/20.1 |
| 2010/0139184 A1 * | 6/2010 | Williams et al. | 52/173.3 |

FOREIGN PATENT DOCUMENTS

| | | | | |
|---|---|---|---|---|
| DE | 38 16 866 A1 | 11/1989 | | |
| DE | 196 39 102 A1 | 3/1998 | | |
| EP | 0 337 085 A2 | 10/1989 | | |
| FR | 2 390 926 A1 | 12/1978 | | |
| FR | 2 872 382 A1 | 1/2006 | | |
| FR | 2 902 602 A1 | 12/2007 | | |
| GB | 2070403 | 9/1981 | | |
| GB | 2 239 155 A | 6/1991 | | |
| GB | 2239155 | 6/1991 | | |
| GB | 2300099 | 10/1996 | | |
| GB | 2412558 | 5/2005 | | |
| GB | 2 457 537 A | 8/2009 | | |
| GB | 2475101 | 5/2011 | | |
| JP | 06228919 A | 8/1994 | | |
| JP | 10-131216 A | 10/1998 | | |
| JP | 2002-27829 | 1/2002 | | |
| JP | 2003274751 A | 9/2003 | | |
| JP | 2003-325052 | 11/2003 | | |
| JP | 2004150214 A | 5/2004 | | |
| JP | 2006/246844 A | 9/2006 | | |
| JP | 2009169367 A | 7/2009 | | |
| KR | 10-0794671 | 1/2008 | | |
| WO | WO 2006/134938 | 12/2006 | | |
| WO | WO 2006134938 A1 * | 12/2006 | | |
| WO | WO 2007101339 A1 * | 9/2007 | | A01G 9/12 |
| WO | WO 2010/009505 | 1/2010 | | |

OTHER PUBLICATIONS

Fytogreen Australia web page screen shot entitled, "Modular Turf," http://www.fytogreen.com.au/products/verticalgarden/faq.html, Dated: Jun. 18, 2008, 6 pages.
Fytowall drawing entitled, "Typical Fytowall," Drawing TP 1, Dated Feb. 4, 2009.
Fytowall drawing entitled, "Typical Elevation," Drawing TP 2, Dated Feb. 4, 2009.
Fytowall drawing entitled, "Typical Side Elevation," Drawing TP 3, Dated Feb. 4, 2009.
Fytowall drawing entitled, "Typical Section Side Surround," Drawing TP 4, Dated Feb. 4, 2009.
Fytowall drawing entitled, "Suggested Drip Tray Configuration," Drawing TP 5, Dated Feb. 4, 2009.
Fytowall drawing entitled, "Typical Irrigation Cabinet Installation and Requirements," Drawing TP 6, Dated Feb. 4, 2009.
Fytogreen web page screen shot entitled, "Fytogreen > Vertical Gardens Home >Modular Turf," Dated Jun. 18, 2008, 2 pages, accessed from www.fytogreen.com.au.
Fytogreen web page screen shot entitled, "Fytogreen > Vertical Gardens Home > Vertical Turf," Dated Jun. 18, 2008, 2 pages, accessed from www.fytogreen.com.au.
http://www.resike.co.uk/Add_Files/BioWall_Intro2.pdf (see p. 4).
International Search Report for related international application PCT/US2010/055866, mailed May 11, 2011.
Fytowall web pages (3) of Fytowall—Your Perfect Vertical Garden, accessed Spring/Summer 2010.
Material Safety Data Sheet for Hydrocell, Fytofoam, Fytocell, Fytoclone and Fytowall,accessed Spring/Summer 2010.
International Preliminary Report on Patentability (Chapter II of the Patent Cooperation Treaty) dated Jan. 10, 2012.
International Preliminary Report on Patentability (Chapter II of the Patent Cooperation Treaty) dated Mar. 6, 2012.

* cited by examiner

PLANT WALL AND MODULES FOR GROWING PLANTS

This application claims priority to U.K. Patent Application No. 0919544.7 filed Nov. 9, 2009, the disclosure of which is herein incorporated by reference.

TECHNICAL FIELD

The present disclosure is directed to walls and modules for growing plants. The walls may include at least one module configured to receive plants from which the plants are capable of growing.

BACKGROUND

Walls from which plants grow are known in the prior art. Such walls may be formed from a matrix of rectangular box building components secured to a backing board. Each component is filled with a growing medium, and plants grow through apertures in a front face of a component with their roots positioned in the growing medium. Such components and walls are described in UK Patent Publication 2457537.

One problem with these walls relates to the loss of valuable nutrients. The plants in the walls are irrigated with water, which contains nutrients. As the nutrient-containing water is fed into the components, excess water is pulled downwardly by gravity, trickles down through apertures in the bottom face of an upper wall component, and then enters a lower component immediately below the upper wall component through its top face. This leads to over-irrigation of the plants at the bottom of the wall. In addition, plants grow inconsistently over the wall. Plants at the bottom of the wall die from excessive water, while plants at the top of the wall can die from inadequate water and nutrients.

Another problem with the prior art is that irrigation pipes are integrated with and inseparable from the wall components. If it is desired to remove a component from the wall, for example to replace it or provide it with new plants, the irrigation pipes also need to be disconnected. The disconnection and removal of the irrigation pipes is time consuming and inefficient, and may adversely affect the plants and roots, for example, by damaging the plants and roots.

A need exists for a structure that provides for the controlled delivery, distribution, and drainage of water and nutrients to a plant wall for use in growing plants. The wall components or modules used in the plant wall would then provide for a more even distribution of water and nutrients across all levels of the plant wall.

SUMMARY

The teachings herein alleviate one or more of the above noted problems by providing a module and plant wall for growing plants. In one example, the module includes a main body for housing an inert growing medium. The main body has a front, back, top, bottom, and sides. The inert growing medium includes a plurality of sections separated from one another by a capillary break. The inert growing medium is configured to receive at least one plant from which the plant is capable of growing. In another example, the capillary break includes a capillary membrane. The capillary membrane may comprise a mesh core and a permeable membrane secured to one or both sides of the mesh core. In a further example, the inert growing medium is comprised of a mineral fiber, which fiber is oriented substantially parallel to the top and bottom of the main body of the module. The module may further include a heating element for supplying heat to the growing medium.

The module may include a drainage channel adjacent to the back of the main body. Excess water delivered to the inert growing medium exits from the growing medium into the drainage channel. In one example, the drainage channel may be formed in a drainage membrane. A permeable membrane and impermeable membrane may comprise the drainage membrane, in which the permeable membrane is positioned adjacent to the back of the main body. In another example, the drainage channel may be formed in a drainage module positioned adjacent to the back of the main body.

A second embodiment of the plant wall includes a module for housing an inert growing medium. The module is configured to receive and facilitate the growing of at least one plant. The module includes a front, back, top, bottom, and sides. A support frame provides for securing the module to a wall. The plant wall also includes an irrigation system for delivering water (and any necessary nutrients) to the growing medium. A drainage channel is formed between the back of the module and support frame. Excess water delivered to the inert growing medium by the irrigation system exits from the growing medium of an upper module into the drainage channel, without entering into modules positioned below the upper modules. In another example, the plant wall may include a plurality of modules.

A third embodiment of the plant wall comprises a drainage channel formed within a drainage membrane. A permeable membrane and impermeable membrane together form a drainage membrane. The permeable membrane is positioned adjacent to the back of the module. In another example, the drainage channel may be formed in a drainage module positioned between the back of the module and the support frame.

In a fourth embodiment, a plant wall includes a removable module for housing an inert growing medium, configured to receive at least one plant. The plant is capable of growing within the removable module. The removable module includes a front, back, top, bottom, and sides. A support frame is further provided for securing the removable module to a wall. The plant wall also includes an irrigation system for delivering water (and any necessary nutrients) to the growing medium. The removable module and irrigation system are configured such that the removable module may be removed from the support frame without removing the irrigation system. In another example, the plant wall may include a plurality of removable modules, which form a matrix.

In a fifth embodiment, a drainage channel is formed between the back of the module and support frame. Excess water delivered to the inert growing medium by the irrigation system exits the growing medium, and drains into the drainage channel. In another example of the plant wall, the drainage channel may be formed in a drainage membrane. A permeable membrane and impermeable membrane may comprise the drainage membrane. The permeable membrane is positioned adjacent to the back of the module. In another example, the drainage channel may be formed in a drainage module positioned between the back of the module and the support frame. In a further example, the drainage channel may be configured such that the removable module may be removed from the support frame without removing the drainage channel. In other examples, the plant walls may further include a heating element for supplying heat to the plants and roots placed in the inert growing medium.

Additional advantages and novel features will be set forth in part in the description which follows, and in part will become apparent to those skilled in the art upon examination of the accompanying drawings, or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

To understand the present teachings, they will now be described by way of example, with reference to the accompanying drawings in which.

DETAILED DESCRIPTION

In the following detailed description, numerous specific details are set forth by way of examples in order to provide a thorough understanding of the relevant teachings. While the present disclosure and teachings described herein are susceptible of embodiments in many different forms, preferred embodiments are shown in the drawings and will be described herein in detail with the understanding that the present disclosure is to be considered an exemplification of the principles and teachings discussed herein and are not intended to limit the broad scope of the disclosure and teachings disclosed. However, it should be apparent to those skilled in the art that the present teachings may be practiced without such details. In other instances, well known methods, procedures, and/or components have been described at a relatively high-level, without detail, in order to avoid unnecessarily obscuring aspects of the present teachings.

The examples disclosed herein provide a plant wall and module for growing plants. The plant wall and modules discussed herein provide for the controlled delivery of water and nutrients to plants located on the plant wall and modules, and also for the drainage of excess water and nutrients from the plant wall and modules. As a result, plants located at different levels of the plant wall are evenly watered, which keeps the plants robust and capable of growing evenly across the plant wall. In addition, the plant wall and modules provide root control such that roots are confined and contained within and around the modules, and do not grow beyond the confines and the capacity of the plant wall.

The plant wall and modules may be in the form of various configurations, and create a vertical garden or other structure incorporating living plants. Such structures, e.g., free-standing vertical towers, structures, and walls, are described in co-pending U.S. application Ser. No. 12/661,848 and U.S. Provisional Patent Application No. 61/233,188, the disclosures of which are herein incorporated by reference. For example, the plant wall for growing plants may comprise a matrix of modules, each module filled with a growing medium preferably having openings in which plants are secured, and from which plants can grow from the growing medium. An irrigation system delivers water to each module. Each module may be removed and replaced without removal of the irrigation system from the wall. In addition, a drainage channel is formed so that excess water may exit the modules. Capillary breaks may also be provided within the growing medium of each module to aid in the distribution of water throughout the growing medium and control growth of plant roots through the medium.

As shown in FIGS. 1-5, a plant wall 2 may be formed on a wall 4. The plant wall 2 may be formed from a module 10 or a plurality of modules 10. In the example shown in FIG. 1, a matrix 8 (shown by way of example as four rows of two columns) is formed, the matrix comprised of a plurality of modules 10. The modules 10 each include a main body 11, which may take the form of a substantially hollow rectangular box, but may also take the form of various other shapes such as a circles, ovals, squares, other polygonal shapes, or irregular shapes. In addition, while shown as a matrix of identical or nearly identical structures and shapes, the plant wall may alternatively be formed of a combination of different shaped modules 10.

Figure 4:
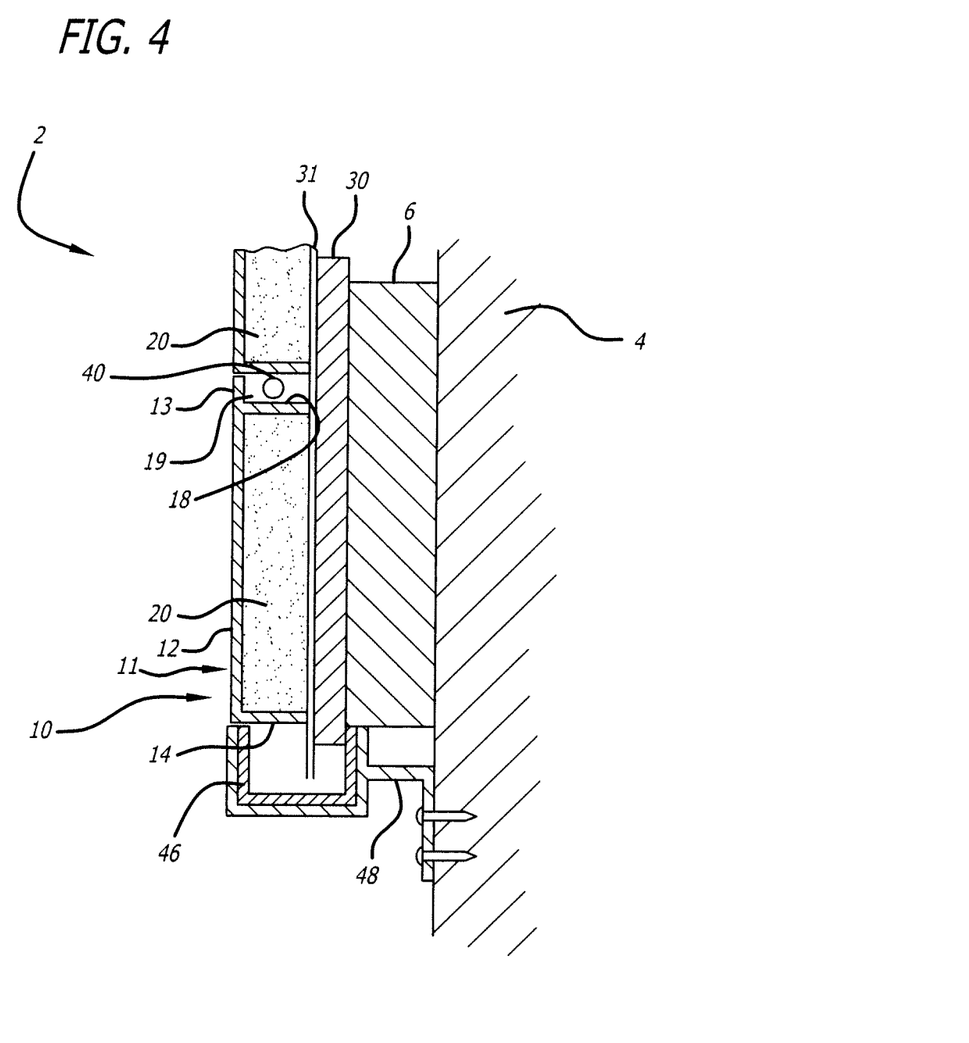
FIG. 4 illustrates a cross-section of a module according to an example of the present disclosure.
Figure 5:
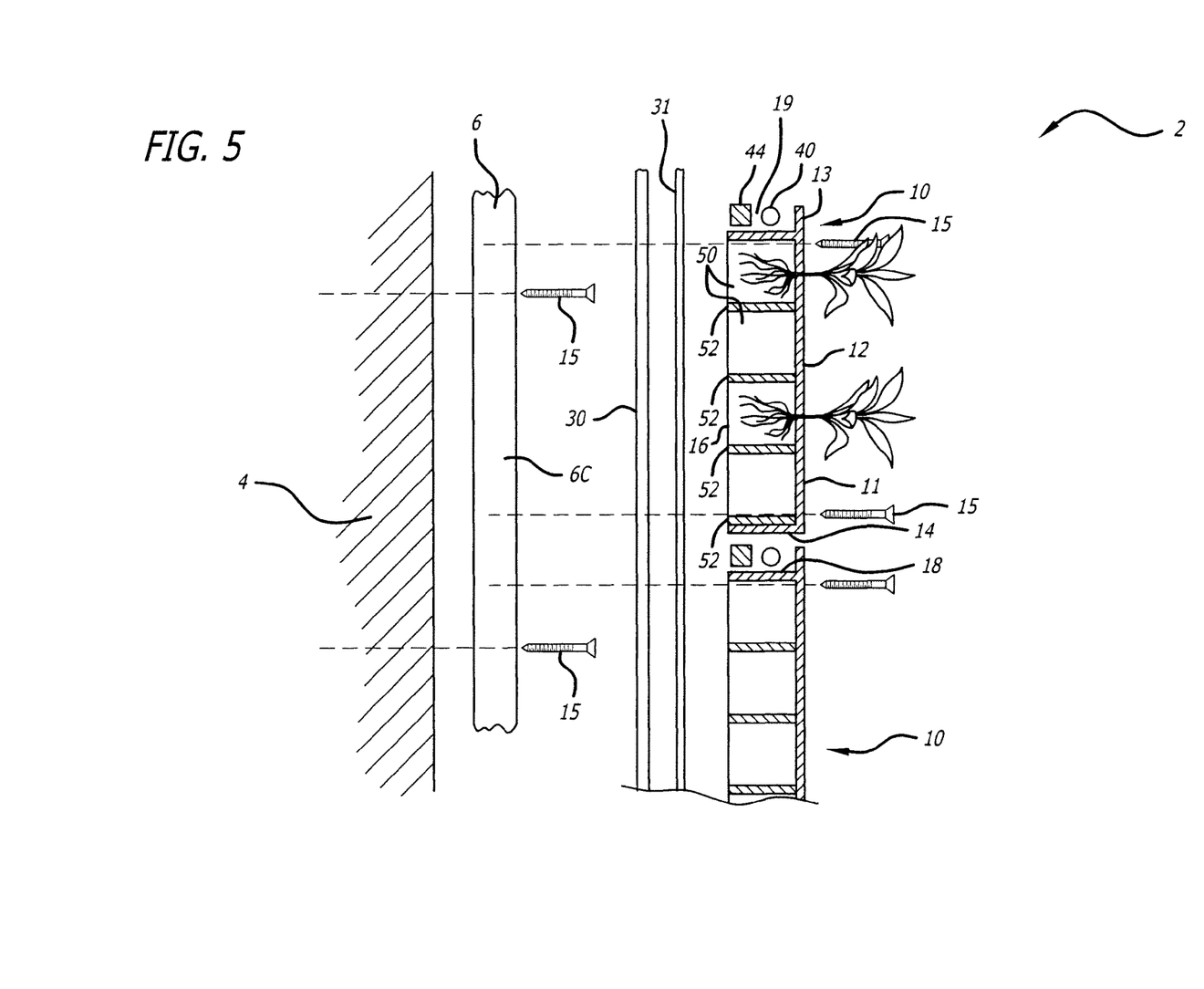
FIG. 5 illustrates an exploded side elevation cross-section of a plant wall according to another example of the present disclosure.

Each module 10 includes an inert growing medium 20 housed within the main bodies 11 of modules 10 (see FIGS. 4 and 5). The growing medium 20 may fill the interior of the module 10 or a portion thereof. The growing medium is preferably an inert mineral fiber, for example, horticultural rockwool, an example of which is sold under the tradename Gro/dan®. A particular type of Gro/dan® suitable for use as the inert growing medium is Product Ref. PP 100/100, although other types and grades of Gro/dan® may be used. Further, other suitable inert growing media, which are preferably inorganic, chemically inert, and dimensionally stable, may be employed. In another example, the inert growing medium is oriented within the modules 10 such that the longitudinal fibers of the inert growing medium, such as the fibers of a mineral fiber, extend substantially parallel to the top face 18 and bottom face 14.

The inert growing medium 20 may further include openings (not shown) for receiving plants. The openings may extend through the entire thickness of the growing medium or partially therethrough. The openings are dimensioned to receive and secure plants positioned within the openings. In a preferred example, the roots of the plants are positioned in the openings, and the leaf portions and/or flowering portions of the plants extend outwardly from the openings. The growing medium allows the roots of the plants to grow into, through, as well as behind the growing medium, thus further securing and anchoring the plants to the growing medium.

Figure 3:
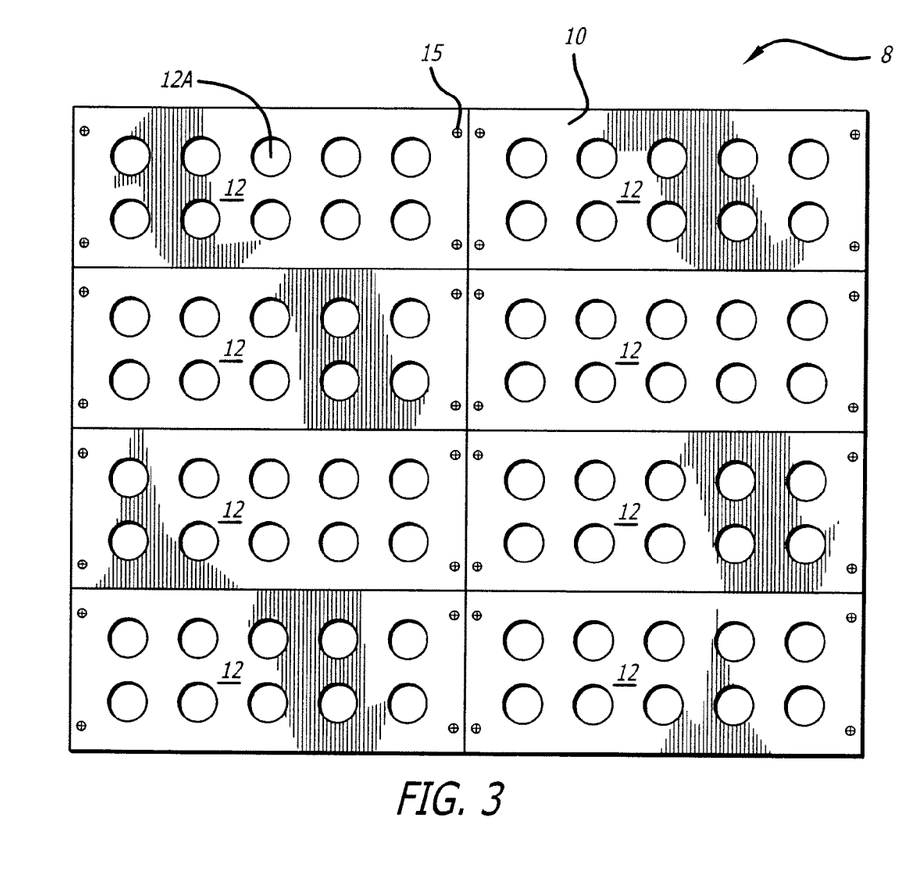
FIG. 3 illustrates a front elevation of the exemplary plant wall shown in FIG. 1.

The main bodies 11 of modules 10 each include a front face 12 and apertures 12A formed therein through which plants can grow from the growing medium 20. While shown as circles, the openings may take the form of any shape, such as ovals, squares, rectangles, other polygonal shapes, or irregular shapes. The apertures 12A may be dimensioned to correspond to the size of the openings formed in the growing medium or may be larger or smaller. In one example, the apertures 12A are larger than the openings formed in the growing medium which allows the plants to grow and spread outwardly from the main body. In addition, the exposed portions of the growing medium, e.g., the portions of the growing medium not covered by the front face 12, attract moss, algae, or other similar plants and organisms which attach to the growing medium and grow therefrom. The front face 12 may also include ventilation holes (not shown) for supplying additional air to the growing medium 20. The front face 12 may also include a felt or textured surface upon which moss, algae, or other similar plants and organisms may attach and grow, thus providing the front of the modules with a green appearance. Each main body 11 also has a bottom face 14, which is preferably sealed, a rear face 16, which is preferably open allowing the escape of water from the module 10, a top face 18 with water entry apertures 18A, 18B, and side faces 17A, 17B. Each main body 11 may also include a lip 13 extending up from the front face 12. When two modules 10 are placed next to each other, with the lip 13 of one module 10 abutting against the front face 12 of another module, a cavity 19 is formed between the top face 18 of one module 10 and the bottom face 14 of the other module 10. As shown in FIG. 3, the lip 13 allows the front faces 12 of the modules 10 to abut together without gaps in between. This gives the impression that the two front faces are a single planar surface, while still providing the cavity 19 between the components for an irrigation system (discussed below), which cannot be seen.

Figure 1:
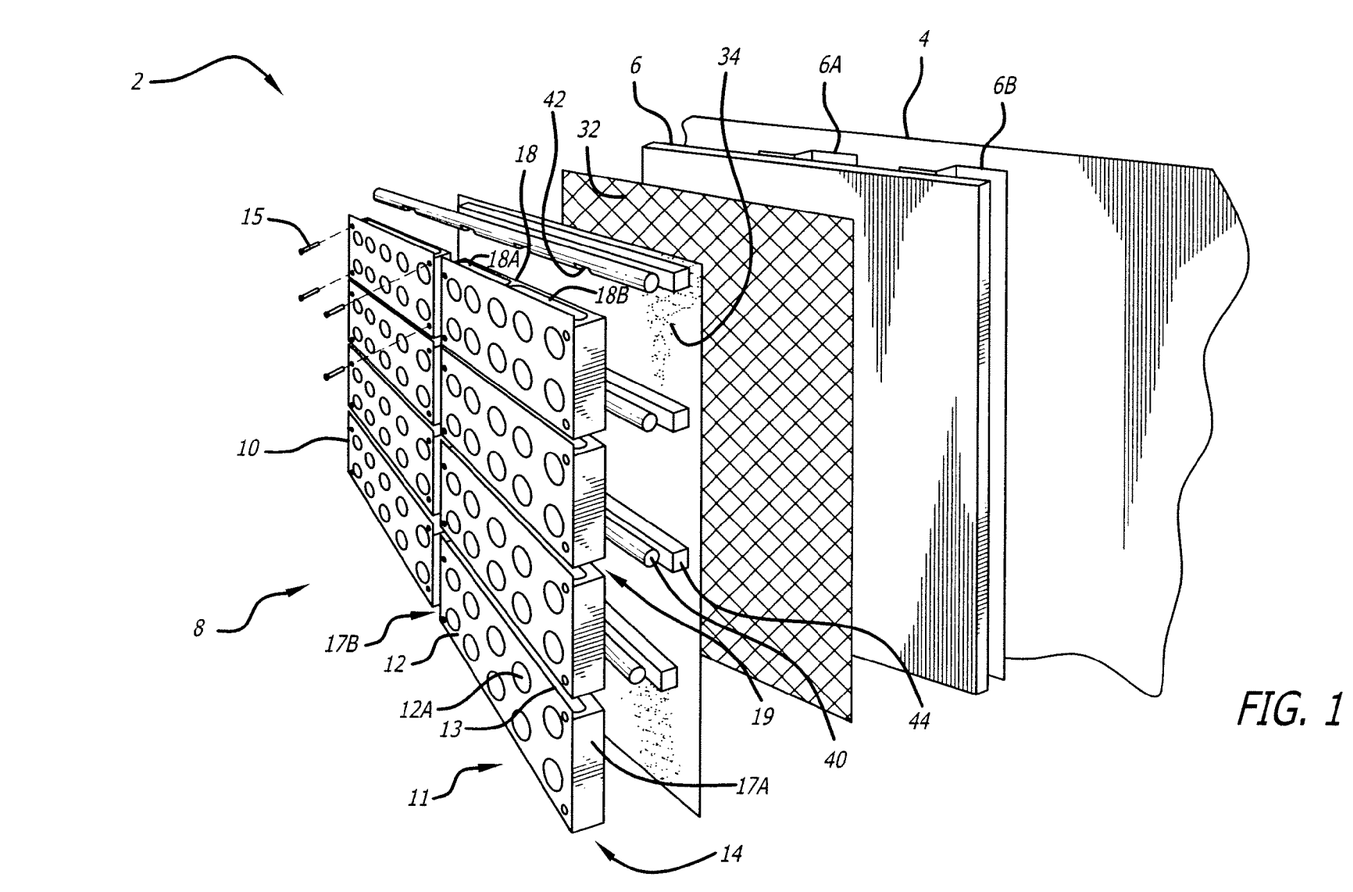
FIG. 1 illustrates an exploded view of a plant wall according to one example of the present disclosure.

The wall 4 may be a stand-alone structure or a wall of a building, or other vertical structure, such as the free-standing vertical structures described in co-pending U.S. application Ser. No. 12/661,848 and U.S. Provisional Patent Application No. 61/233,188, the disclosures of which are herein incorporated by reference. A support frame 6, e.g., a sheet of plywood (FIG. 1) or cladding rails (FIG. 5), may be provided to secure the modules 10 to the wall 4. Modules may also be secured directly to wall 4 without use of a support frame. In addition, wall 4 may include a support frame 6 as part of its structure. As shown in FIG. 1, support frame 6 is provided with brackets 6A, 6B for securing the support frame 6 to wall 4. As shown in FIG. 5, support frame 6 comprises vertical cladding rails 6C secured to wall 4. The cladding rails 6C may be spaced apart an appropriate horizontal distance, such as a distance shorter than the width of the modules 10. In another example, horizontal cladding rails or other configurations may be provided on wall 4 and spaced an appropriate distance. Modules 10 may be secured to the wall 4 and/or support frame 6 using screws 15 or other suitable fasteners.

Figure 2:
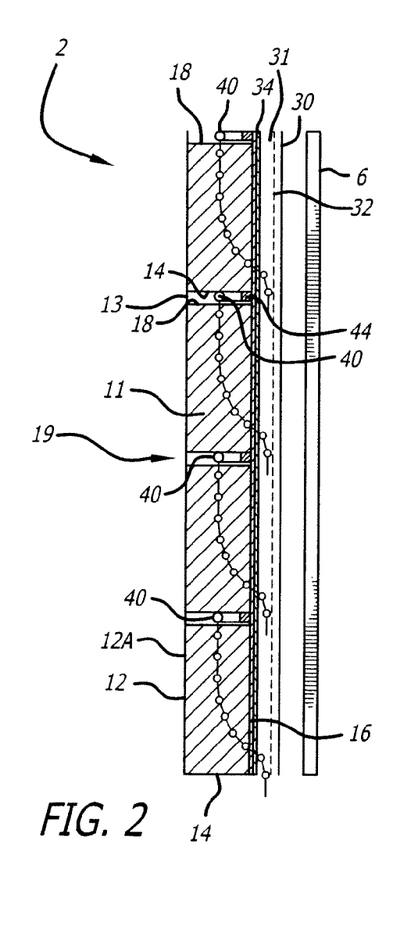
FIG. 2 illustrates a side elevation cross-section of the exemplary plant wall shown in FIG. 1.

A drainage channel is provided between the rear of each module 10 and the support frame 6. The drainage channel may take the form of a void or space formed behind the rear 16 of the modules. As shown in FIGS. 1, 2, 4 and 5, the drainage channel is formed by a drainage membrane 31. As shown in FIGS. 1 and 2, the drainage membrane 31 may be comprised of a netting mesh 32 and a permeable sheet 34. The netting mesh 32 is located between an impermeable backing sheet 30 and the permeable sheet 34. The netting mesh 32 may be comprised of an interwoven netting mesh of plastic, polymer, or other suitable material. The netting mesh 32 is positioned adjacent to and, preferably, secured to the impermeable backing sheet 30. The permeable sheet 34, such as a water permeable fabric or other suitable material, is provided on the netting mesh 32 adjacent to the rear face 16 of the modules 10. The netting mesh 32 serves as a substrate for the permeable sheet 34, and forms a space or void between the rear 16 of modules 10 and the backing sheet 30. The space or void may be created by the netting mesh structure itself, or by providing the netting mesh 32 with raised portions or other structures. The space or void create a drainage channel between the rear face 16 of the modules 10 and the backing sheet 30. The drainage channel may be configured to hold about 15% or more of the irrigation water supplied to the modules at any one time. In other examples, the drainage channel may be configured to hold less than about 15% of the irrigation water.

In one example, the drainage membrane 31 may take the form of a geotextile composite. Suitable geotextile composites are sold by Terram Limited, Great Britain. The geotextile composites include an impermeable polymer extruded grid core with a permeable filter bonded or otherwise secured to one side of the grid core. The polymer grid core includes raised portions to which the permeable filter is secured or otherwise attached. The raised portions and voids therebetween create a drainage channel through which excess water delivered to the growing medium may be removed from the module, as discussed in more detail below.

The drainage membrane 31 may be comprised of a single piece of material or a plurality of pieces of material secured to each other by suitable techniques. In addition, the drainage membrane may be secured to the support frame 6 through backing sheet 30 or may be secured to the rear faces 16 of the modules 10. In another example, each module 10 may include a drainage membrane 31 integrated with the module 10, and secured or otherwise attached, for example, to the rear face 14 of module 10.

The impermeable backing sheet 30, such as a waterproof backing board, is provided adjacent to the support frame 6. The backing sheet 30 may be secured in any conventional way to the support frame 6. In one example, the backing sheet 30 may be formed from a plurality of backing sheets, secured and sealed together to form an impermeable backing sheet 30. The impermeable backing sheet 30 prevents water and moisture from contacting the support frame 6 and wall 4.

An irrigation system is provided to deliver water (and any necessary nutrients) to the apertures 18A, 18B on the top face 18 of each module 10. The irrigation system includes a pipe 40 located adjacent to the top face 18 of the modules 10. The pipe includes water drain apertures 42 for delivering water to the water entry apertures 18A, 18B of each module. The pipe 40 may be mounted on battens 44 located between modules 10 (FIG. 2). Battens 44 may also serve to support the bottom face 14 of modules 10, while the modules are being secured to the support frame 6, especially the first time the modules 10 are placed on the frame 6. The pipe 30 is secured to the support frame 6 and positioned in cavity 19 formed between the top 18 of one module 10 and the bottom 14 of another module 10. The pipes 30 may include valves located incrementally along the length of the pipe 30. The valves regulate the amount of water delivered to the modules 10 and ensure that water is distributed evenly throughout the irrigation system.

The irrigation system may also include a suitable tank or reservoir for holding water for supply to the plant wall. The irrigation system also includes suitable pumps or other devices for delivering the appropriate amounts of water through the system. In addition, if desired, the irrigation system includes mixers, such as an impeller, or other suitable equipment for combining the appropriate amount of nutrients with the water. The nutrients may be stored in a reservoir or other suitable equipment integrated with the irrigation system for controlling the supply of the appropriate amounts and types of nutrients to the plant wall. In one example, the irrigation system is controlled by a computer or other suitable controller and/or microprocessor. The controller may operate the pumps and vales to control the amount of water supplied to the wall. In addition, the controller may operate the impellers and mixers that supply nutrients to the irrigation water. The irrigation system may also be controlled locally at the location of the plant wall, or remotely via a suitable communications network. In other examples, the irrigation system includes sensors, such as flow rate and/or temperature sensors for monitoring the conditions of the irrigation system and plant wall. The sensors may be electrically connected to the controller for providing signals and feedback to the controller. For example, the controller may be provided with information, such as weather patterns, forecasts, and conditions of the plant wall, for example, temperature and humidity. The controller then may adjust the amount of water and/or nutrients supplied to the plant wall based on this information. In one example, during a hot and dry period, the controller may operate to supply more water to the plant wall, as compared with a cooler or wet period.

As shown in FIG. 2, water (and any necessary nutrients) is delivered to each module 10 by the irrigation system to irrigate plants held therein. Irrigation pipes 40 deliver water through water drain apertures 42 to the top 18 of modules 10. Water flows through the apertures 18A, 18B. The inert growing medium 20 absorbs the water and distributes the water throughout the growing medium. In one example, the inert growing medium once fully saturated may hold about 10 times its dry weight in water and nutrients, although growing mediums may hold other amounts depending on the properties of the medium. Any excess water delivered to the growing medium 20 exits the growing medium through the rear face 16 of the module 10. The excess water exiting from the inert growing medium 20 enters the drainage channel through the permeable sheet 34 and flows downward from the module 10 without entering into other modules 10 located below. This prevents over-irrigation and drowning of the plants near the bottom of the plant wall, and thereby facilitates consistent growth of plants along the entire height of the plant wall. In another example, the modules 10 may be configured to allow water to escape from one or more side faces 17A, 17B of the module 10 into a drainage channel positioned between the rear 16 of each module 10 and the backing sheet 30, instead of or in addition to water escaping from the rear face 16 of each module 10.

If it is desired to remove a module 10 from the support frame 6, the module can simply be removed by removing screws 15 or other securing devices. This can be done without interfering with the irrigation system. The irrigation pipes 40 may remain in place, i.e., in their installed position, while the modules are installed, removed, replanted, and replaced onto the plant wall. This allows for ease of maintenance and replacement of modules on the plant wall. Further, removal of modules without disturbing the irrigation system improves the ease by which the creative design of the plant wall may be altered or modified. For example, by allowing easy, efficient, and simple exchange of modules having different plant designs placed therein, the plant wall may be modified and altered quickly and easily without the considerable additional effort needed to also remove the irrigation system. Another benefit is that the irrigation system may be used with different types of modules for growing plants on the plant wall. These different modules preferably include structure forming a cavity for receiving the irrigation system, to contain and supply water to the modules.

As shown in FIG. 4, a gutter 46 is positioned below the modules 10 to collect excess water from the drainage channel. The gutter 46 is secured to the wall by bracket 48 or another suitable fastener. The gutter 46 is positioned behind the backing sheet 30 and configured such that water exiting the drainage channel does not seep back into and contact the support frame 6 or wall 4. The gutter 46 may lead to a reservoir or other suitable storage equipment such that excess water may be collected and, if desired, re-used or recycled back to the irrigation system. This reduces the amount of water used by the irrigation system, thus improving its efficiency and creating a sustainable structure for growing plants.

FIG. 5 shows an example of a module 10 having the inert growing medium 20 comprised of growing medium sections 50 separated by capillary breaks 52. The capillary breaks 52 may take the form of a void or space. The sections 50 are preferably longitudinal sections extending the width of the module 10 with capillary breaks between each longitudinal section. The sections 50 may take the form of any shape. For example, instead of longitudinal sections, a plurality of square sections may be provided. In this example, each row of square sections comprises a longitudinal section and capillary breaks need not be provided between adjacent square sections located in the same row (i.e. vertically between each adjacent square section), although they may be provided if desired. The capillary breaks 52 extend horizontally between the sections 50. In addition, a capillary break may be created below the bottommost section 50 adjacent to the interior of the bottom 14 of the module 10. In one example, the sections 50 may be configured and dimensioned such that the capillary breaks are located about every 100 mm along the height of the module, although other suitable dimensions can be used.

In another example, the capillary breaks may take the form of a capillary membrane that forms a void or space between sections 50 of the growing medium 20. The capillary membrane may be formed of a plastic mesh core or other suitable material having permeable fabric or other suitable permeable material bonded or otherwise secured to either side of the mesh core. In one preferred example, the capillary break is formed of a geotextile composite. Examples of geotextile composites suitable for use as capillary membranes are Terram Filtram products sold by Terram Limited, Great Britain. The geotextile composite comprises a permeable polymer extruded mesh core, having openings formed therein, covered on one or both sides by a permeable nonwoven filter. Other suitable materials may be used to form the capillary break as described herein.

The capillary breaks 52 help control the descent of water through the growing medium in order to maintain relatively consistent moisture content throughout the growing medium. The capillary 52 slows the descent of water through the growing medium sections 50. In addition, the breaks 52 evenly distribute the moisture content of each section 50 of the growing medium. Further, excess water supplied to the growing medium may exit from the growing medium into a rear and/or side drainage channel via capillary breaks 52. As a result, water is distributed evenly across the inert growing medium such that plants near the top do not die from lack of water, while plants near the bottom do not die from excessive water. In the example of the capillary break formed of a capillary membrane, while water may pass through the capillary membrane, roots cannot grow through the membrane. As a result, the capillary membrane controls and prevents the growth of roots down through the capillary break. This prevents the roots from growing into the space or void created by the capillary break, and thus maintains the void. The maintenance of the space or void allows the break to evenly distribute water as is descends through the sections 50 of the inert growing medium.

Figure 6:
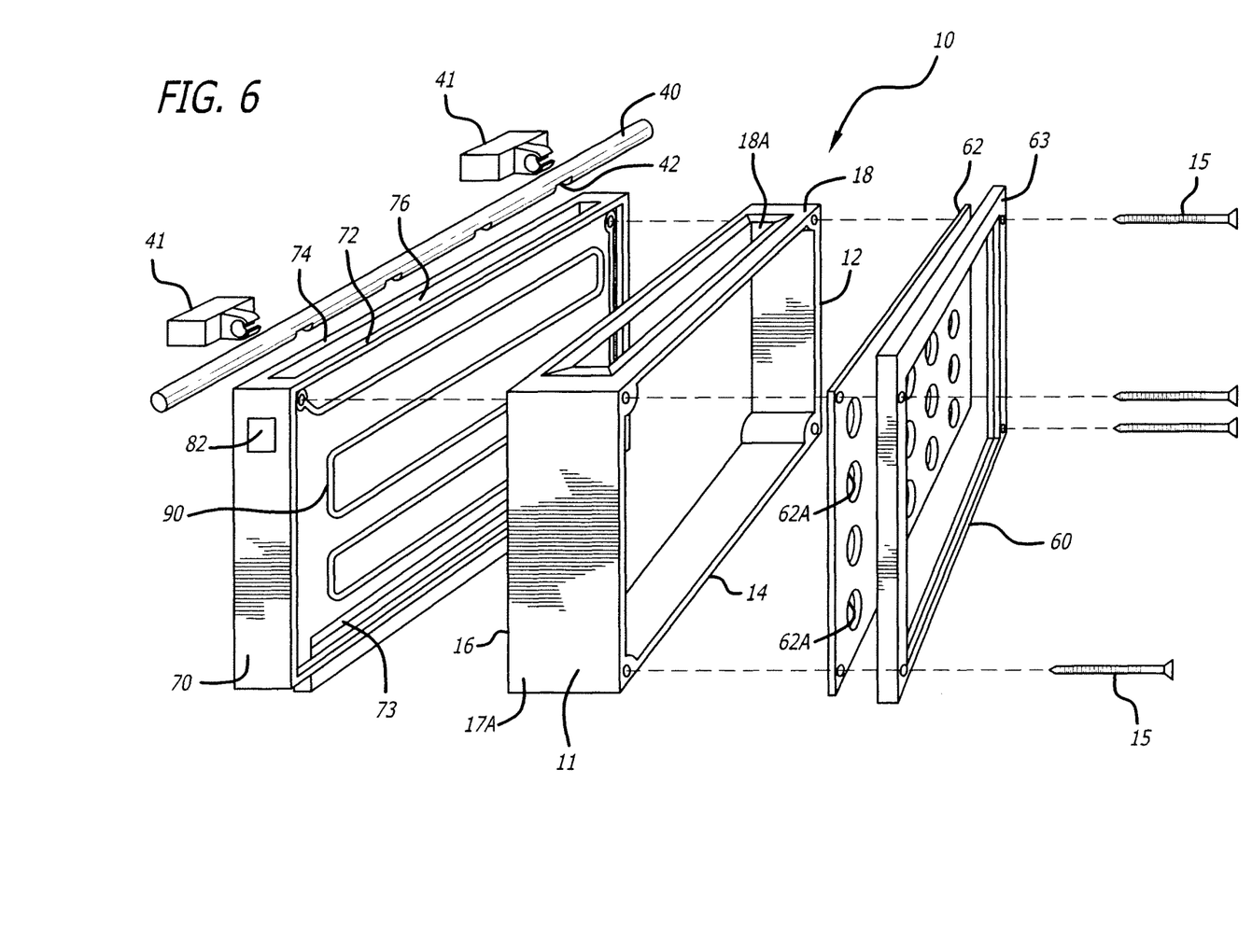
FIG. 6 illustrates an exploded perspective view of a module according to a further example of the present disclosure.
Figure 7:
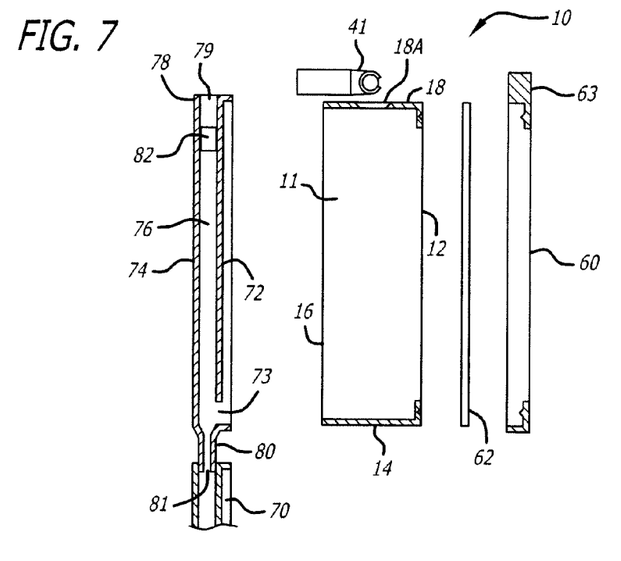
FIG. 7 illustrates an exploded side elevation of the modules according to the exemplary module shown in FIG. 6.

FIGS. 6 and 7 show another example of module 10. Each module 10 includes a main body 11 as discussed above having a front face 12, bottom face 14, rear face 16, side faces 17A, 17B, and a top face 18 having a water entry aperture 18A. A front fascia 60 is provided along with an insert 62 that may be secured to the front face 12 of the main body 11. The front fascia 60 may take the form of a frame as shown, or of other suitable shape and configuration. The fascia 60 includes a lip 63, such as that described above for allowing the front faces 12 of the modules 10 to abut together without intervening gaps. This gives the impression that the front faces comprise a single planar surface. The insert 62 includes apertures 62A formed therein through which plants can grow from the growing medium 20. As discussed above, apertures 62A may be dimensioned to correspond to the size of the openings formed in the growing medium or may be larger or smaller. The insert 62 may also be comprised of or include felt or a textured surface. The insert 62 attracts moss and algae and allows the moss and algae to grow and provide the front of the modules with a green appearance.

Each module 10 also includes a drainage module 70 provided adjacent to the rear face 16 of the main body 11. The drainage module 70 includes a front wall 72 and a back wall 74 having a drainage channel 76 formed therebetween. A drainage opening 73 is provided in the front wall 72. The drainage opening 73 opens into and provides a passageway to the drainage channel 76 from the front of the drainage module 70 adjacent to the rear face 16 of the main body 11. The drainage modules 70 include a top 78 having an opening 79 and a bottom 80, also having an opening 81. The top 78 is configured to receive the bottom 80 of an adjacent drainage module 70. Similarly, the bottom 80 is configured to be received by the top 78 of an adjacent drainage module 70. Each drainage module 70 may also include a side drain 82 located in one or both of the sides of the drainage module 70.

The drainage module 70 may further include a heating element 90, such as a heating coil or cable, for example a resistance heating coil. In another example, the heating element may comprise suitable tubing for receiving a heated fluid, such as copper tubing for receiving heated water. The heating element acts to maintain the temperature of the module 10 and growing medium 20 during freezes or large day-to-day fluctuations in temperature. For example, during the spring freeze-thaw cycle, the heating element may maintain the modules and growing medium at a temperature to prevent freezing of the water stored in the growing medium during cold night temperatures. Further, the heating element may be used during winter to maintain the modules at a suitable temperature. The maintenance of proper temperatures allows the plants to continue to grow and/or prevents plant death during otherwise unsuitable conditions.

As discussed above, an irrigation system is provided to supply water and nutrients to the growing medium 20 housed in modules 10. As shown in FIGS. 6 and 7, an irrigation pipe 40 may be secured by clips 41 or other suitable mechanisms to a wall or other structure (not shown). In operation, the irrigation system, through apertures 42 formed in pipe 40, delivers water and nutrients (if required or desired) to the growing medium 20 through the water entry aperture 18A formed in the top 18 of the main body 11. The growing medium 20 absorbs the water and nutrients and distributes them to the plants placed within the medium 20. Any excess water and nutrients exit the growing medium through the rear face 16 of the main body 11. Water exiting the growing medium 20 contacts the front wall 72 of drainage module 70 and flows downward to drainage opening 73. Water then enters the drainage channel 76 through drainage opening 73. Excess water may then flow into adjacent drainage modules 70 located below, until reaching either a gutter as described above, or any other suitable drainage network. If desired, excess water may also flow out of the drainage channel 76 via side drains 82 formed in the sides of drainage modules 70. The side drains 82 may be formed near the top of the drainage module 70, as shown in FIG. 7, near the bottom of the drainage module 70, or at positions therebetween, or a combination thereof. If sides drains 82 are utilized, then appropriate gutters or similar equipment may be used to collect the water exiting the side drains 82. For example, side drainage channels may be created along the sides of the modules 10 or between adjacent modules 10. In one example, a drainage membrane, as discussed above, may be located adjacent to one or both sides of the modules and extend vertically therefrom to create a side drainage channel.

Figure 8:
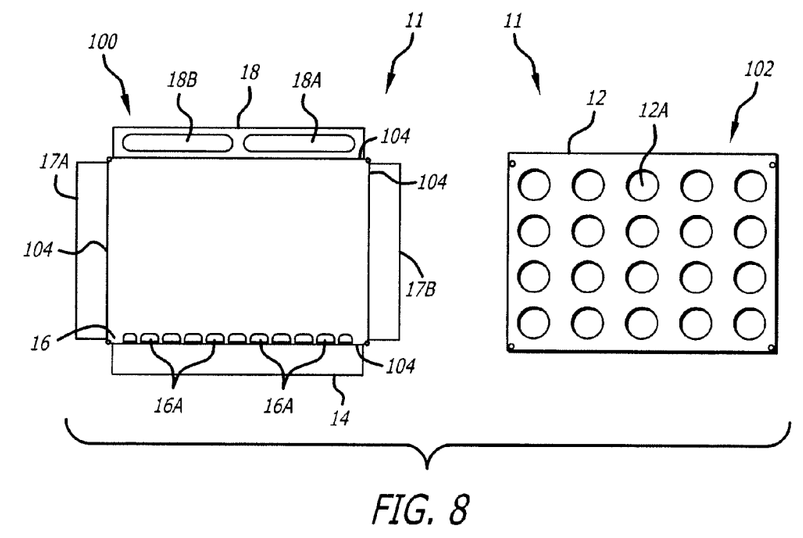
FIG. 8 illustrates a top view of a module according to a further embodiment of the present disclosure, including a first section and a second section.
Figure 9:
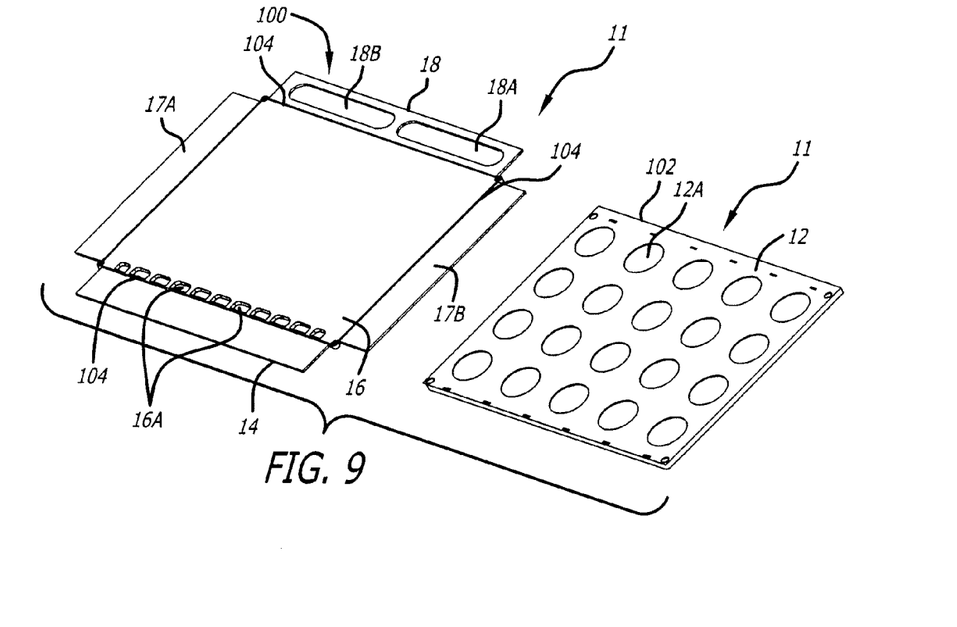
FIG. 9 illustrates a perspective view of the module shown in FIG. 8.

Another example of the module 10 is shown in FIGS. 8 and 9. The main body 11 may be formed of a first section 100 and a second section 102, which are joined in any suitable way to form the main body 11. The sections may be molded or otherwise formed of suitable materials, such as polymers, plastics, composites, traditional building materials, or combinations thereof. The bottom section 100 includes a top face 18 having water entry apertures 18A, 18B formed therein. In this example, rear face 16 is closed and includes drainage openings 16A formed near the bottom face 14 of main body 11. Drainage openings 16A may also be formed in other locations along the rear face 16. The first section 100 also includes side faces 17A, 17B. Although not shown, side faces 17A, 17B may include drainage openings in addition to or in place of drainage openings 16A. Each face of the main body 11 is connected to an adjacent face via hinges 104.

Figure 10:
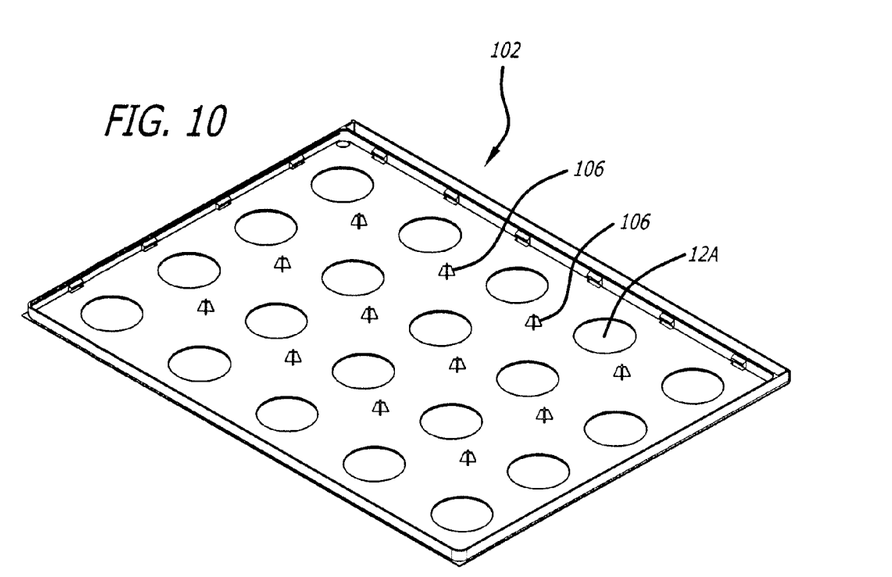
FIG. 10 illustrates a perspective view of the back side of the second section of the module of FIGS. 8 and 9.

The second section 102 comprises front face 12 that includes apertures 12A formed therein for allowing plants to grow therefrom. As discussed above, apertures 12A may be dimensioned to correspond to the size of the openings formed in the growing medium or may be larger or smaller. Ventilation holes (not shown) may also be formed in front face 12. The front face 12 may also include a textured or felt front upon which moss, algae, or similar plants and organisms may attach and grow. As shown in FIG. 10, the second section 102 may include raised portions 106 formed on the interior face thereof. The raised portions 106 help secure and support the inert growing medium within the main body 11, for example, as shown in FIG. 12.

Upon assembly of the main body 11, the faces may be folded along the hinges and secured together by any suitable means to form an open rectangular box. Front face 14 of second section 102 is then secured to the first section 100 by any suitable means to thus complete the assembly of main body 11. In a preferred example, support clips 112 may be provided at the corners of the main body to reinforce and strengthen the main body where the first section 100 and second section 102 are secured together.

Figure 11:
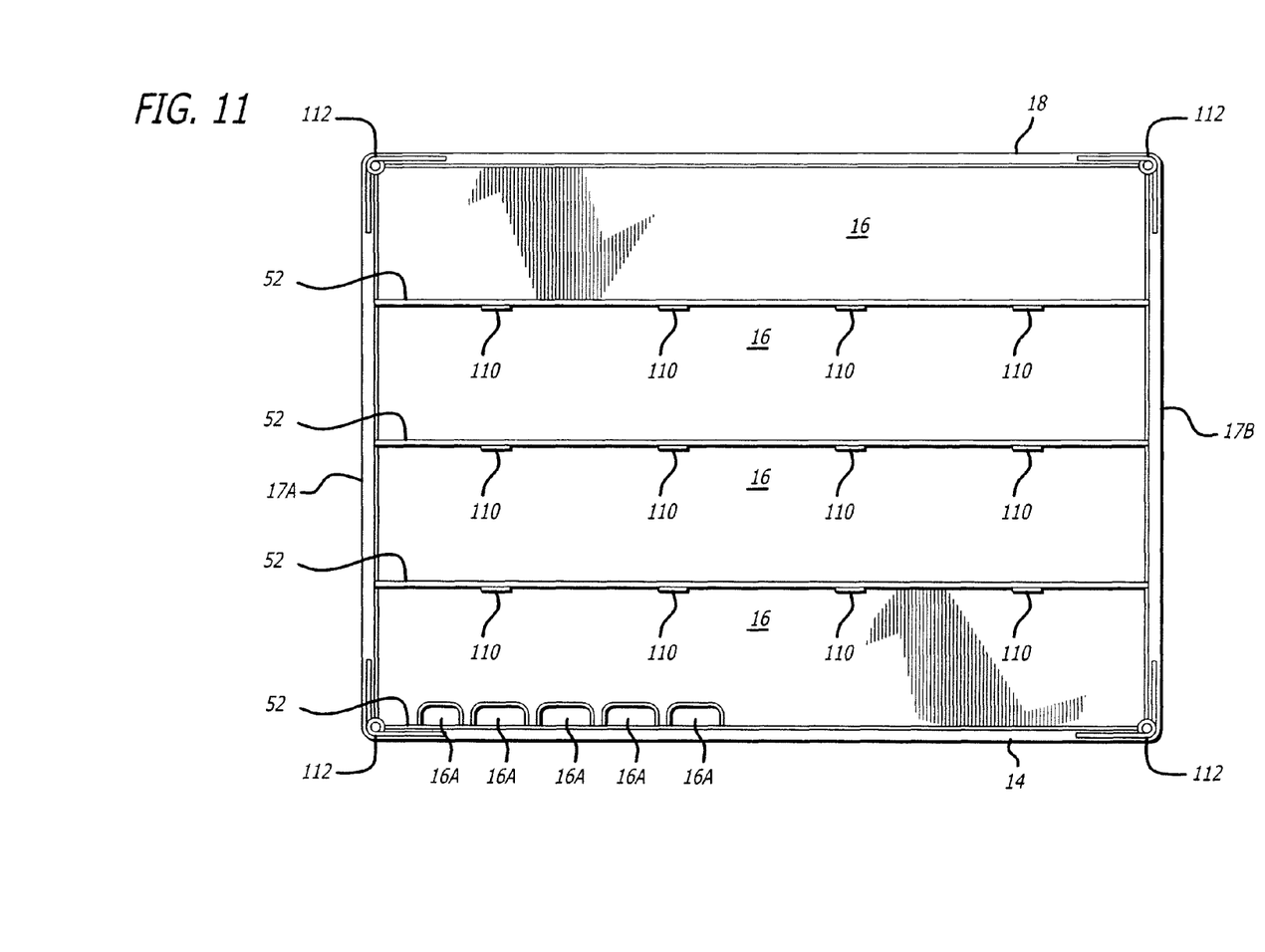
FIG. 11 illustrates a front elevation of the first section of the module shown in FIG. 8.
Figure 12:
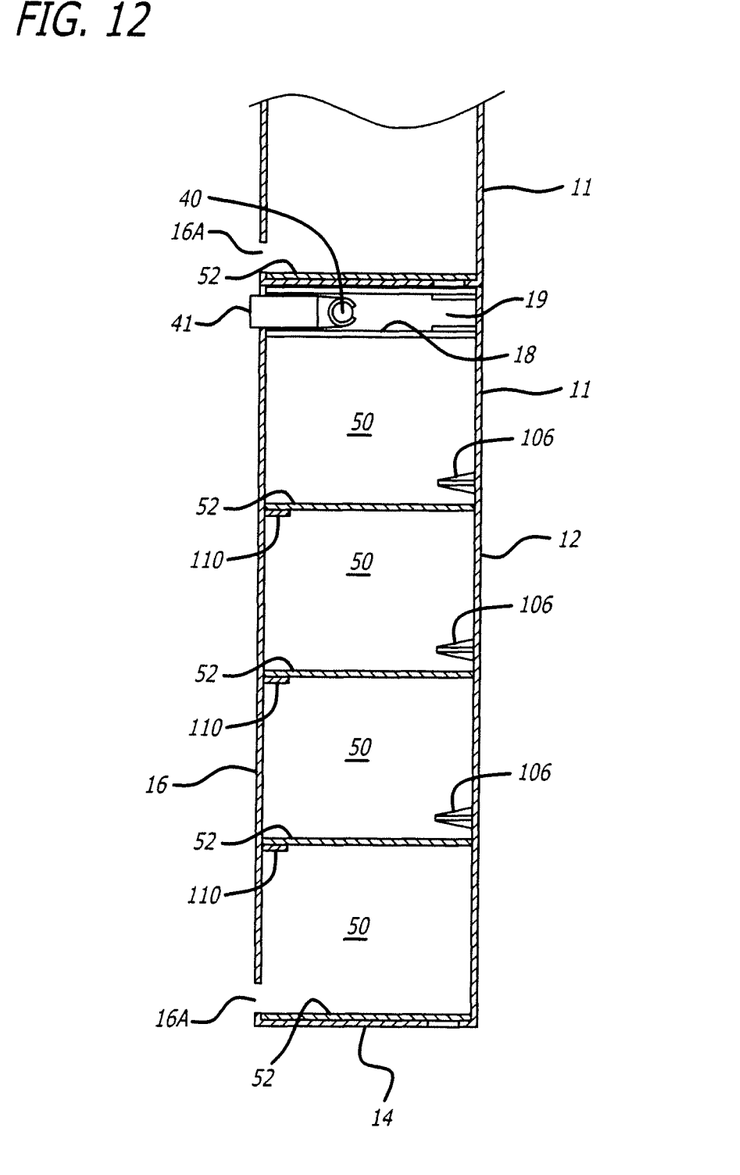
FIG. 12 illustrates a side elevation of the module shown in FIG. 8.

As shown in FIGS. 11 and 12, the main body 11 may include capillary breaks 52. FIG. 11 illustrates the front of the module without the front face 14 placed thereon. As discussed above, capillary breaks may take the form of capillary membranes. The capillary membranes are supported within the main body by shelves 110. The shelves 110 also support the inert growing medium 20 such as longitudinal sections 50 (discussed above) of the inert growing medium placed on top of the capillary membranes. The inert growing medium may be dimensioned so that a space is formed between the rear face 16 and the back of the inert growing medium 20 when the inert growing medium 20 is placed within main body 11. FIG. 11 also illustrates a sub-set of the drainage openings 16A formed near the bottom of the rear face 16. In addition, although not shown, a capillary membrane may be placed in front of drainage openings 16A between the back of the inert growing medium 20 and the interior of rear face 16. This capillary membrane prevents plant roots from escaping the module through openings 16A and growing beyond the confines of the module.

In operation, water and any necessary nutrients are supplied via irrigation pipe 40 to the to the inert growing medium 20 as described above. As water and nutrients enter water entry apertures 18A, 18B and descend through the growing medium, water and nutrients are evenly distributed throughout the growing medium. When the water and nutrients come into contact with the capillary membrane, they spread out across the membrane such that the water and nutrients may be evenly delivered to the longitudinal section 50 located below the membrane. In addition, excess water and nutrients exit from the capillary membrane and travel down the space formed between the back of the inert growing medium and the rear face 16 of the main body. Excess water then passes through the capillary membrane positioned over drainage openings 16A before exiting the module via openings 16A. Additionally, side drainage openings (not shown) may be provided in one or both side faces 17A, 17B in lieu of or in addition to drainage openings 16A, such that water exiting the capillary membrane may exit into a space formed between the inert growing medium 20 and one or both side faces 17A, 17B and through side drainage openings. Thus, water and nutrients exiting the capillary membrane at one level do not travel back into the growing medium at a lower level. In this way, as discussed above, the modules 10 keep the plants robust and capable of growing evenly across the plant wall. In addition, the plant wall and modules provide root control such that roots are confined and contained within and around the modules, and do not grow beyond the confines and the capacity of the modules 10.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments and examples could be provided in any combination with the other embodiments and examples disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A plant wall for growing plants comprising:
at least one module for housing an inert growing medium, the module including a front, back, top, and a bottom, the inert growing medium configured to receive at least one plant;
a support frame for securing the at least one module to a wall;
an irrigation system for delivering water and nutrients to the growing medium, wherein the irrigation system includes an irrigation pipe positioned adjacent to an opening formed in the top of said module, wherein said module and the irrigation system are configured such that the module may be removed from the support frame without removing the irrigation pipe, and wherein said irrigation system distributes water evenly across the growing medium as water descends through said top opening in said housing; and
at least one drainage module positioned between the back of the module and the support frame, the drainage module including a front wall, an impermeable back wall, a top and a bottom defining a drainage channel, the front wall positioned adjacent to the back of the module and having at least one drainage opening, wherein excess water delivered to the inert growing medium by the irrigation system exits from the growing medium through the at least one drainage opening and into the drainage channel,
wherein a plurality of at least one drainage modules are vertically connected to each other such that the bottom of a first drainage module is connected to the top of a second drainage module providing a continuous drainage channel between vertically adjacent modules of the plant wall such that the water exiting a higher module does not enter another module located below.

2. The plant wall of claim 1, wherein the inert growing medium comprises a mineral fiber oriented substantially parallel to the top and bottom of the module.

3. The plant wall of claim 1, further comprising a plurality of modules configured as a matrix.

4. The plant wall of claim 1, further comprising an impermeable backing sheet between the drainage channel and the support frame.

5. A plant wall for growing plants comprising:
at least one removable module for housing an inert growing medium, the removable module including a front, back, top, and bottom, the inert growing medium configured to receive at least one plant;
a support frame for securing the removable module to a wall;
an irrigation system for delivering water and nutrients to the growing medium, wherein the irrigation system includes an irrigation pipe positioned adjacent to an opening formed in the top of the removable module and the removable module and the irrigation system are configured such that the removable module may be removed from the support frame without removing the irrigation pipe and wherein the growing medium comprises a plurality of sections separated from one another by a capillary break, the capillary break comprises a capillary membrane that distributes water evenly across the growing medium as water descends through the plurality of sections and prevents roots of a plant in the growing medium to grow through the capillary membrane and down through the capillary break; and
at least one drainage module positioned between the back of the removable module and the support frame, the drainage module including a front wall, an impermeable back wall, a top and a bottom defining a drainage channel, the front wall positioned adjacent to the back of the removable module and having at least one drainage opening, wherein excess water delivered to the inert growing medium by the irrigation system exits from the growing medium through the at least one drainage opening and into the drainage channel,
wherein a plurality of at least one drainage modules are vertically connected to each other such that the bottom of a first drainage module is connected to the top of a second drainage module providing a continuous drainage channel between vertically adjacent removable modules of the plant wall such that the water exiting a higher removable module does not enter another module located below.

6. The plant wall of claim 5, wherein the inert growing medium comprises a mineral fiber oriented substantially parallel to the top and bottom of the module and the capillary break extends substantially horizontal between the plurality of sections.

7. The plant wall of claim 5, wherein the drainage channel is configured such that the removable module may be removed from the support frame without removing the drainage channel.

8. The plant wall of claim 5, further comprising a plurality of removable modules configured as a matrix.

9. The plant wall of claim 5, further comprising an impermeable backing sheet between the drainage channel and the support frame.

10. The plant wall of claim 5, wherein the capillary membrane comprises a mesh core and a permeable membrane covering at least one side of the mesh core.

11. A plant wall for growing plants comprising:
at least one module for housing an inert growing medium, the module including a front, back, top, and a bottom, the inert growing medium configured to receive at least one plant;
a support frame for securing the module to a wall;
an irrigation system for delivering water and nutrients to the growing medium, wherein the growing medium comprises a plurality of sections separated from one another by a capillary break, the capillary break comprises a capillary membrane that distributes water evenly across the growing medium as water descends through the plurality of sections and prevents roots of a plant in the growing medium to grow through the capillary membrane and down through the capillary break; and
at least one drainage module positioned between the back of the module and the support frame, the drainage module including a front wall, an impermeable back wall, a top and a bottom defining a drainage channel, the front wall positioned adjacent to the back of the module and having at least one drainage opening, wherein excess water delivered to the inert growing medium by the irrigation system exits from the growing medium through the at least one drainage opening and into the drainage channel,
wherein a plurality of at least one drainage modules are vertically connected to each other such that the bottom of a first drainage module is connected to the top of a second drainage module providing a continuous drainage channel between vertically adjacent modules of the plant wall such that the water exiting a higher module does not enter another module located below.

12. The plant wall of claim 11, wherein the inert growing medium comprises a mineral fiber oriented substantially parallel to the to and bottom of the module and the capillary break extends substantially horizontal between the plurality of sections.

13. The plant wall of claim 11, further comprising a plurality of modules configured as a matrix.

14. The plant wall of claim 11, wherein the capillary membrane comprises a mesh core and a permeable membrane covering at least one side of the mesh core.

15. The plant wall of claim 11, further comprising an impermeable backing sheet between the drainage module and the support frame.

* * * * *